(12) United States Patent
Onishi

(10) Patent No.: US 7,668,649 B2
(45) Date of Patent: Feb. 23, 2010

(54) DISPLAY METHOD AND APPARATUS FOR NAVIGATION SYSTEM

(75) Inventor: Hirofumi Onishi, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 715 days.

(21) Appl. No.: 10/686,895

(22) Filed: Oct. 16, 2003

(65) Prior Publication Data

US 2005/0085999 A1    Apr. 21, 2005

(51) Int. Cl.
    *G06F 19/00* (2006.01)
(52) U.S. Cl. .................. 701/208; 340/995; 715/837
(58) Field of Classification Search .............. 701/211, 701/208, 209, 201, 212, 213; 345/837, 855, 345/968; 235/384; 340/995.4, 995; 715/837
See application file for complete search history.

(56) References Cited

U.S. PATENT DOCUMENTS

| | | | |
|---|---|---|---|
| 6,321,158 B1 * | 11/2001 | DeLorme et al. ............ 701/201 |
| 6,571,169 B2 | 5/2003 | Miyaki |
| 6,836,723 B2 * | 12/2004 | de Silva ...................... 701/200 |
| 2002/0130906 A1 * | 9/2002 | Miyaki ........................ 345/837 |
| 2004/0243306 A1 * | 12/2004 | Han ............................ 701/211 |
| 2005/0051623 A1 * | 3/2005 | Okuda et al. ................ 235/384 |

FOREIGN PATENT DOCUMENTS

JP    2001-264083    9/2001

* cited by examiner

*Primary Examiner*—Khoi H. Tran
*Assistant Examiner*—Ronnie Mancho
(74) *Attorney, Agent, or Firm*—Muramatsu & Associates

(57) ABSTRACT

A display method and apparatus for a navigation system which is capable of easily and quickly showing the existence of a large structure within which a specific point of interest ("POI") is located. The navigation system searches a desired point of interest as specified by a user, examines whether the point of interest is located within a large structure, searches an icon representing a type of the large compound in which the point of interest is located, and when a particular point of interest is located within a large structure, displays the icon of the large structure and the POI name on a monitor of the navigation system. Upon selection of the icon by the user, the navigation system displays detailed information on the large structure.

18 Claims, 11 Drawing Sheets

Prior Art
Fig. 1A
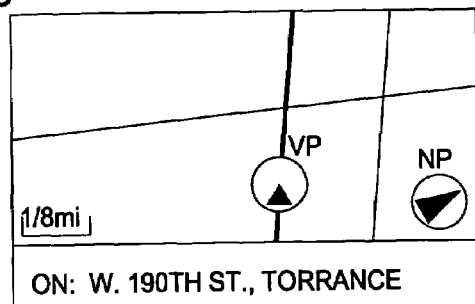
Fig. 1B
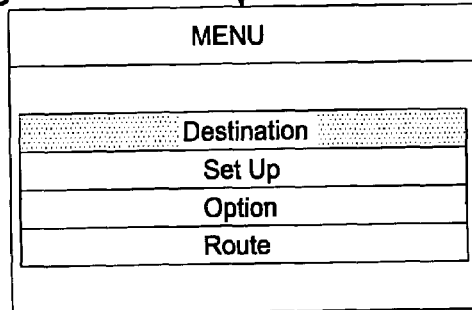
Fig. 1C
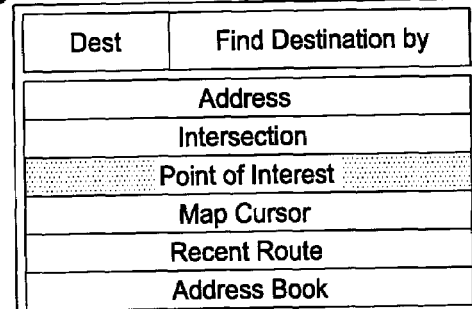
Fig. 1D
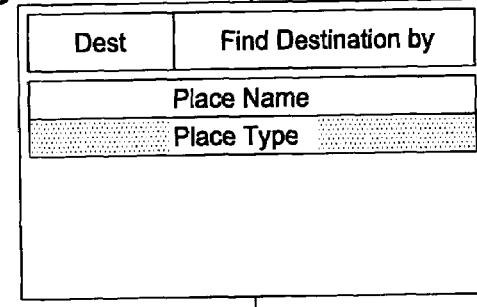
Fig. 1E
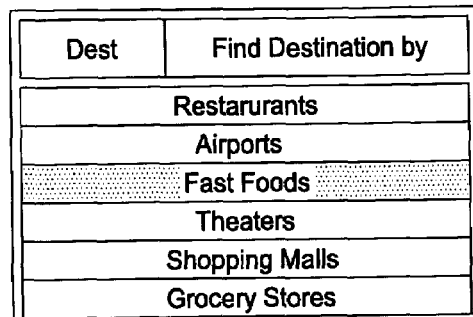
Fig. 1F
| Fast Foods | Hit 397 |
|---|---|
| Burger King | 1.23mi ↘ |
| Carl's Jr. | 1.45mi ↗ |
| Kentrucky Fried Chicken | 1.69mi ↑ |
| Pizza Hut | 2.21mi ↘ |
| Del Taco | 2.67mi ↗ |
Fig. 1G
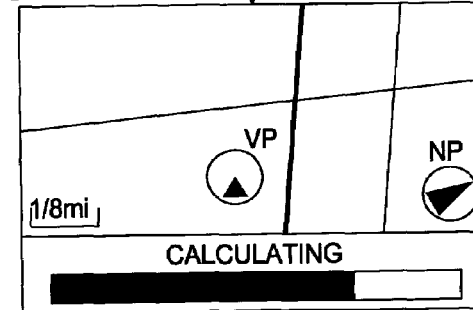
Fig. 1H
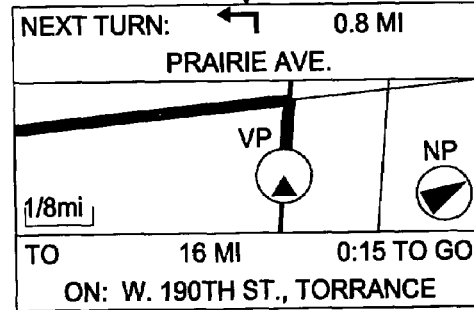

Fig. 3A (Prior Art)

| Fast Foods | | Search in 384 Mile | Hit 396 |
|---|---|---|---|
| Burger King | | 1.53mi | ↘ |
| Carl's Jr. | | 2.17mi | ↗ |
| Kentucky Fried Chicken | | 2.36mi | ↗ |
| Pizza Hut | | 2.37mi | ↘ |
| Yoshinoya | | 2.73mi | ↑ |
| From Current Location | | | |

Fig. 3B (Prior Art)

| Fast Foods | | Search in 384 Mile | Hit 396 |
|---|---|---|---|
| Burger King / LAX Airport | | 1.53mi | ↘ |
| Carl's Jr. | | 2.17mi | ↗ |
| Kentucky Fried Chicken / Fairground Mall | | 2.36mi | ↗ |
| Pizza Hut / LA Station | | 2.37mi | ↘ |
| Yoshinoya | | 2.73mi | ↑ |
| From Current Location | | | |

Fig. 7A

| Dest | Find Destination By | |
|---|---|---|
| | Address | Intersection |
| | Point of Interest | |
| | Phone Number | |
| | Latitude / Longitude | |
| | Previous Destinations | |
| | Address Book | |
| | Today's Plan | 5 |

Fig. 7B

Enter ↓  ↑ Cancel

| Dest | Find Point of Interest By |
|---|---|
| | Place Name |
| | Place Type |

Fig. 7C

Enter ↓  ↑ Cancel

| Dest | Select Category |
|---|---|
| | ATM |
| | AUTOMOTIVE |
| | BANK |
| | EMERGENCY |
| | FAST FOODS |
| | GAS STATION |

Fig. 7D

Enter ↓  ↑ Cancel

| Fast Foods | | Hit 397 |
|---|---|---|
| Burger King | | 1.23mi ↘ |
| Carl's Jr. | Icon | 1.45mi ↗ |
| Yoshinoya | | 1.69mi ↑ |
| Pizza Hut | Icon | 2.21mi ↘ |
| Del Taco | | 2.67mi ↗ |

DISPLAY METHOD AND APPARATUS FOR NAVIGATION SYSTEM

FIELD OF THE INVENTION

This invention relates to a display method and apparatus for a navigation system for guiding a user to a destination, and more particularly, to a display method and apparatus for a navigation system which is capable of listing points of interest (POIs) with distinction as to whether a particular POI is located within a large structure.

BACKGROUND OF THE INVENTION

A navigation system performs travel guidance for enabling a user to easily and quickly reach the selected destination. A typical example is a vehicle navigation system where a user drives a car equipped with a navigation function. Such a navigation system detects the position of the user or user's vehicle, and reads out map data pertaining to an area at the current vehicle position from a data storage medium, for example, a CD-ROM (compact disc read-only memory), a DVD (digital versatile disc), or a hard disc. Alternatively, such map data can be provided to the user from a remote server through a communication network such as Internet. The navigation system displays a map image on a monitor screen while superimposing a mark representing the current location of the user on the map image.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, the route without using toll road, or the like.

During the route guidance, the navigation system reads the nodes data from the data storage medium such as DVD and successively stores the nodes data of road segments (expressed in longitude and latitude) constituting the guided route in a map memory. In the actual traveling, the node series stored in the map memory is searched for a portion of the guided route to be displayed in a map display area of the monitor screen, and the portion of the guided route is highlighted to be clearly distinguished from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

FIGS. 1A-1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIG. 1B-1F. A main menu screen such as shown in FIG. 1B displays menu items including a "Destination" menu for entering the destination. When selecting "Destination", the navigation system displays an "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number. Other methods in the "Find Destination by" screen include "Recent Route" for specifying the destination based on the recent history of destinations saved in the navigation system, and "Address Book" for selecting the address of the destination out of the prescribed address list stored in the system.

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The order of listing the categories may be arranged in, for example, an alphabetical order or an order of distance from the current position. The user selects a desired category of POIs from the lists. If there are many entries in the list that cannot be displayed on one screen, a user may scroll the list by a scroll key of a scroll bar.

FIG. 1F shows a screen when the user has selected a "Fast Foods" category in the example of FIG. 1E. In this example, the screen includes the name of POI type "Fast Foods" at the top and a list of names of the fast food restaurants typically sorted by distance from the current destination. The list may also show rough direction of each fast food restaurant by an arrow. In this example, the user selects "Pizza Hut" as his destination.

In FIG. 1G, the navigation system calculates and determines a guided route to the destination, i.e., the selected POI "Pizza Hut". In this example, the navigation system displays a progress scale during the calculation of the route to the destination. After determining the guided route, the navigation system starts the route guidance as shown in FIG. 1H. Typically, the navigation system shows the intersection which is highlighted to show the next turn and a direction of the turn. Such route guidance by the navigation system is also given by voice instruction.

POIs are sometimes located within a large structure or a large compound (hereafter "large structure"). For example, rather than on a side of a street, a restaurant may be located in a shopping mall, an airport, train station, an amusement park, or the like. Sometimes, a user wants to find a particular POI, such as a restaurant, not because he wants to eat there but rather wants to go to the large structure where the particular restaurant is located. For example, he wants to meet someone in the compound or wants to use a rest room, etc. Moreover, the user sometimes wants to know whether the specific POI is located within a large structure or not. For example, the user may want to avoid a restaurant in a large shopping mall because the restaurant can be far away from the parking lot. In a case where a restaurant is located inside an airport, or other large compound, the user may have to pay a parking fee.

FIGS. 2A-2B show map images involving such situations where a POI is located within a large structure or is located independently from a large structure. A solid circle on the map indicates the position of a specific POI "Pizza Hut". The situation of FIG. 2A indicates that "Pizza Hut" is located independently. In FIG. 2B, the shaded area indicates a large structure such as a shopping mall, airport, or train station, etc. In this example, "Pizza Hut" is located within the large structure.

In the conventional display method of FIG. 3A which shows a list of POIs, the user cannot tell whether a particular POI is located within a large structure. The screen merely shows a list of POIs, distances to the POIs, and rough directions to that POIS. In the conventional display method, it would be possible to additionally include information as to whether a particular POI is associated with a large structure. Such an example is shown in FIG. 3B where a name of large structure is added to the POI in the POI name list. For instance, a POI "Burger King" is accompanied by "LAX Airport" as a large structure to show that "Burger King" is located within the Los Angeles Airport. Likewise, the display shows that "Kentucky Fried Chicken" is located within a shopping mall "Fairground Mall", and "Pizza Hut" is located within "LA Station".

However, this type of display is not appropriate for a vehicle navigation system. First, because the navigation system is mainly used in a limited space such as within an automobile, the space allowed for the navigation display is likewise limited. It is difficult to provide information on both POI and large structure on the display. Second, too much information on each entry tends to distract the user's attention to the safe driving. To minimize text information is desired in order not to distract the user's attention for safe driving. Thus, there is a need for a navigation system that can effectively inform the user whether a particular POI is located in a large structure or not.

SUMMARY OF THE INVENTION

It is, therefore, an object of the present invention to provide a navigation system which enables a user to easily distinguish whether a particular point of interest (POI) is located within a large structure or not.

It is another object of the present invention to provide a display method and apparatus for a navigation system for displaying an icon representing a type of large structure on which a particular point of interest is located on a POI name list screen of the navigation system.

It is a further object of the present invention to provide a display method and apparatus for a navigation system for displaying detailed information of the large compound by selecting an icon of the large compound on the POI name list screen.

In the present invention, the navigation system searches for a desired point of interest specified by a user, examines whether the point of interest is located within a large structure, retrieves an icon representing a type of the large compound in which the point of interest is located, and displays the icon of the large structure and the POI name on a monitor of the navigation system. Upon selection of the icon by the user, the navigation system displays detailed information on the large structure.

One aspect of the present invention is a display method for a navigation system. The display method is comprised of the steps of: receiving map data from a map data storage and retrieves information on points of interest specified by a user; examining whether the point of interest in the retrieved information is located within a large structure; retrieving an icon representing a type of the large structure in which the point of interest is located; and displaying a name of the point of interest located within the large structure together with the icon of the large structure on a monitor screen.

In the process of examining whether the point of interest is located within a large structure, the method includes a step of checking point coordinate data in the map data representing a location of the point of interest and polygon data in the map data representing an area of a land or a structure to see whether or not the location of the point of interest is included within the area of the land or structure.

The display method displays detailed information on the large structure when the user specifies the icon representing the type of large structure. The detailed information on the large structure displayed on the navigation system includes a name, an address, and a telephone number of the large structure. Preferably, the method produces a pop-up screen showing the detailed information on the monitor screen.

Another aspect of the present invention is a navigation system which is comprised of: means for selecting a method for searching point of interest information; a map data storage which stores map data including point of interest information and large structure information; a point of interest display control unit which examines the map data from the map data storage and determines whether a point of interest is located within a large structure; a memory which stores icons where each icon represents a type of large structure expressed by the large structure information in the map data; and a monitor which displays information associated with the navigation system including a list of points of interest. The point of interest display control unit controls the monitor to display the point of interest located within the large structure together with the icon of the large structure, thereby enabling the user to see whether or not a particular point of interest is located within a large structure.

A further aspect of the present invention is a display apparatus for a navigation system for implementing the steps defined in the display method of the present invention noted above. The display apparatus includes various means to examine whether the point of interest is located within a large structure, retrieve an icon representing a type of the large compound in which the point of interest is located, and display the icon of the large structure and the POI name on a monitor of the navigation system.

According to the present invention, the navigation system is capable of informing the user about the existence of a large structure when a particular POI is located within the large structure. Thus, the user is able to decide not to go to that particular POI because it is located within the large structure, or alternatively, go to that particular PCI because he can also use the large structure such as do shopping or use a rest room, etc. The navigation system can effectively minimize the information provided to the user to prevent distraction of the user's attention from the driving by providing information with a pictographic icon. Moreover, the present invention can be readily implemented to a conventional navigation system where the space for a display is limited because the icon does not take much space on the display.

BRIEF DESCRIPTION OF THE DRAWINGS

FIGS. 1A-1H are schematic diagrams showing an example of operational process and screen display involved in the navigation system for selecting a destination.

FIGS. 2A-2B are schematic diagrams showing examples of situation where a particular point of interest is located in which FIG. 2A shows a situation where a point of interest is not located within a large structure, and FIG. 2B shows a situation where a point of interest is located within a large structure.

FIGS. 3A-3B are schematic diagrams showing an example of screen of the conventional navigation system in which FIG. 3A shows a display where no information on large structure that corresponds to a POI is included, and FIG. 3B shows a display where text information on the large structure is added to the POI name in the list.

FIGS. 7A-7D are schematic diagrams showing an example of operation and screen display for selecting a particular POI as a destination by specifying a category of POI in the navigation system of the present invention.

FIG. 9A shows a list of POIs along with icons representing types of large structure, and FIG. 9B shows a list of POIs along with a pop-up screen showing detailed information about the large structure after an icon is specified by the user.

DETAILED DESCRIPTION OF THE INVENTION

The present invention will be described in detail with reference to the accompanying drawings. The navigation system of the present invention is designed to enable a user to quickly grasp whether a particular place, i.e., a point of interest (POI) is located within a large structure or not. The navigation system notifies the user whether the particular POI is associated with a large structure while minimizing the distraction from user's attention to the driving. In order to achieve this goal, the display of the navigation system superimposes an icon next to a POI name in the POI name list to indicate that the POI is located within a particular type of a large structure.

Examples of such a large structure or compound include a shopping mall, an airport, a train station, an amusement park, a sports stadium, a military base, an office building, a university, and the like. In the present invention, not only artificial structures listed above, examples of a large structure also include a large area, such as a mountain, river, lake, desert, reservoir, and the like. An icon to indicate such a large compound is preferably designed to show the feature or visual image of the particular compound. However, an icon can be various forms such as a simple character, number or color.

Figure 2A:
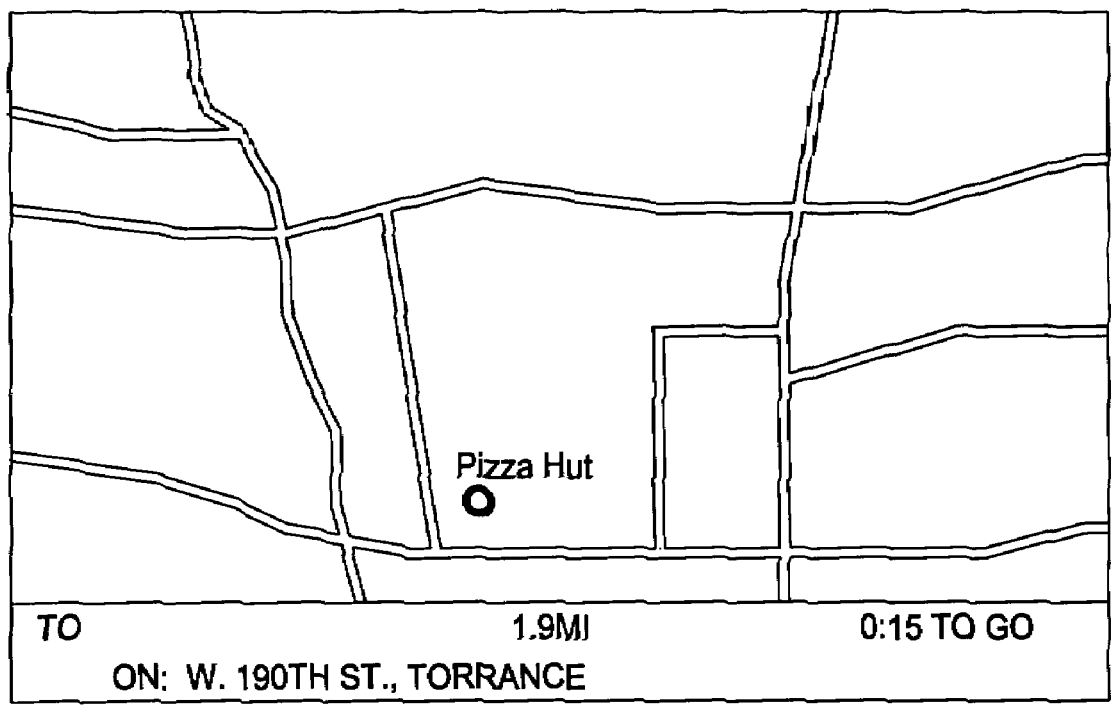
Figure 2B:
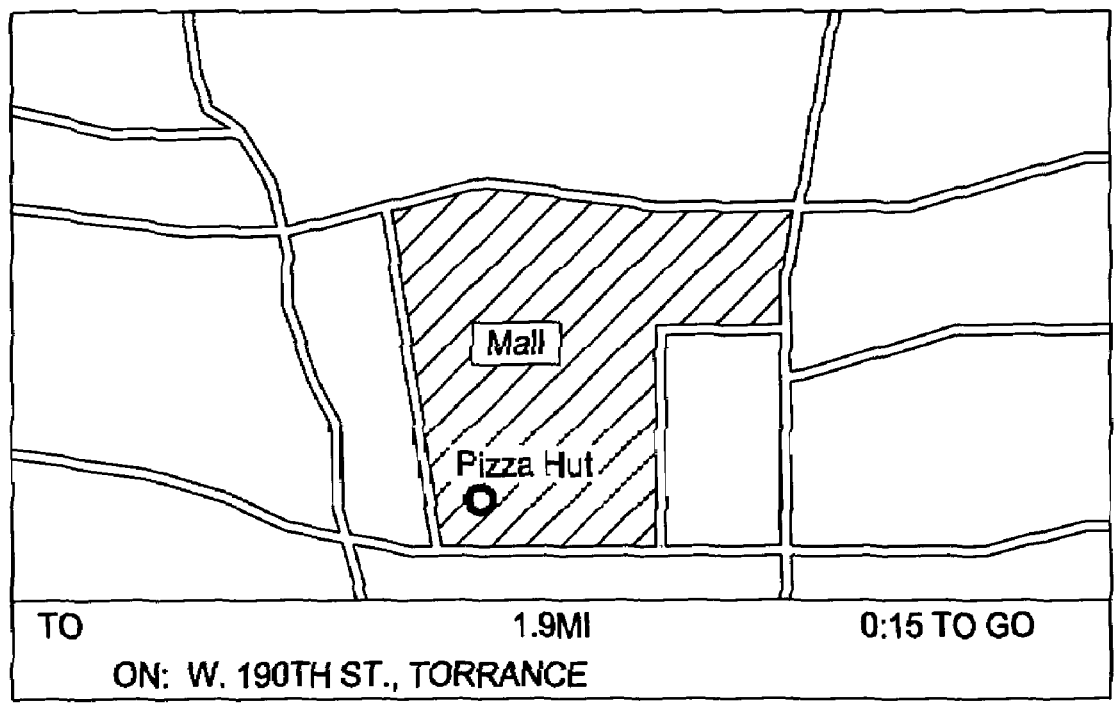
Figure 4:
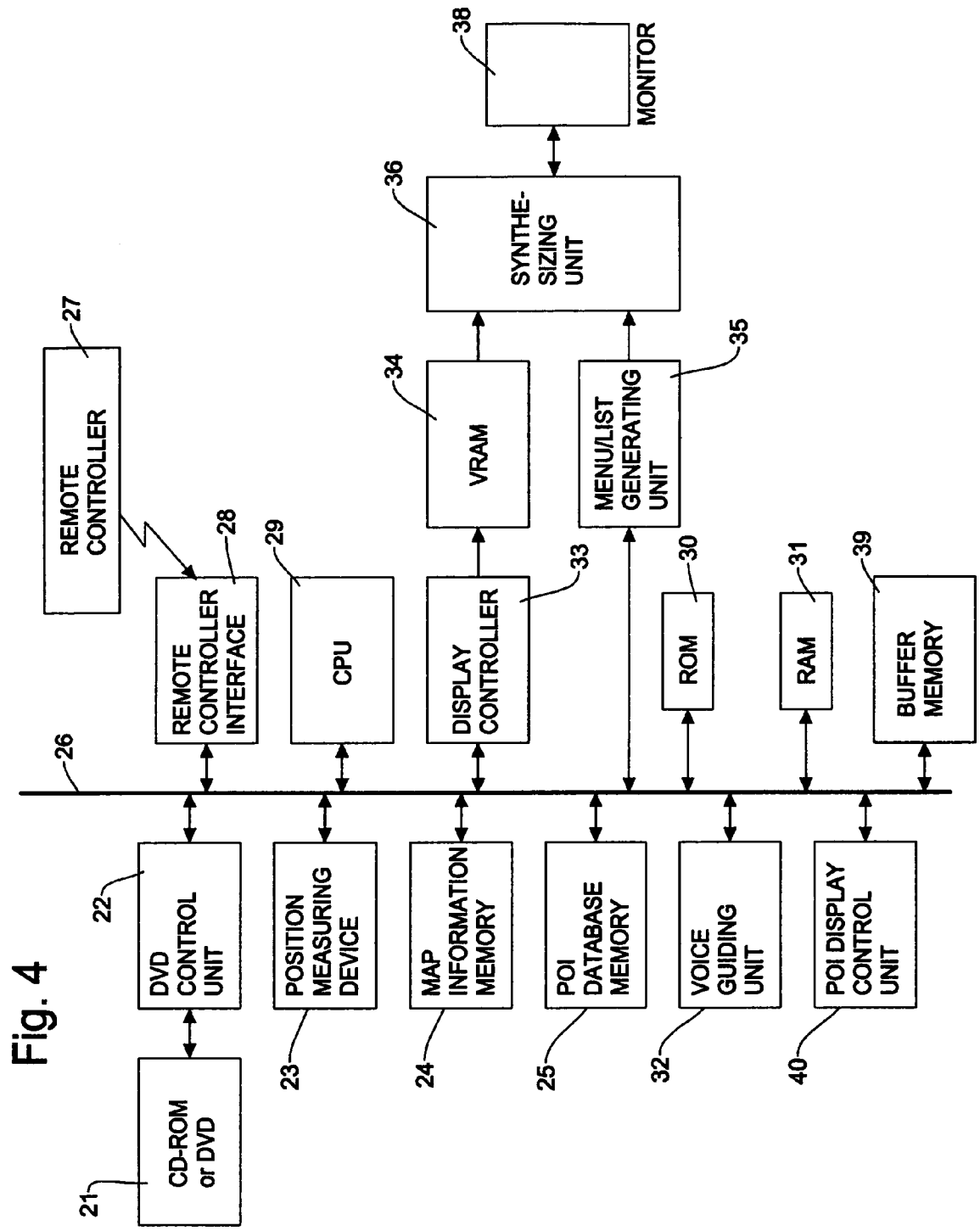
FIG. 4 is a block diagram showing an example of structure in the vehicle navigation system for implementing the present invention.

FIG. 4 shows an example of structure of a vehicle navigation system implementing the present invention. It should be noted that the present invention can also be applied to a portable navigation device such as a one implemented by a PDA (personal digital assistant) device or other hand-held devices. In the block diagram of FIG. 4, the navigation system includes a map storage medium 21 such as a CD-ROM, DVD, hard disc or the like (hereafter "DVD") for storing map information, a DVD control unit 22 for a controlling an operation for reading the map information from the DVD, a position measuring device 23 for measuring the present vehicle position. The position measuring device 23 includes a vehicle speed sensor for detecting a moving distance, a gyro for detecting a moving direction, a microprocessor for calculating a position, a GPS receiver, and etc.

The block diagram of FIG. 4 further includes a map information memory 24 for storing the map information which is retrieved from the DVD 21, a database memory 25 for storing database information such as point of interest (POI) information which is read out from the DVD 21, a remote controller 27 for executing a menu selection operation, an enlarge/reduce operation, a destination input operation, etc. and a remote controller interface 28.

Figure 5A:
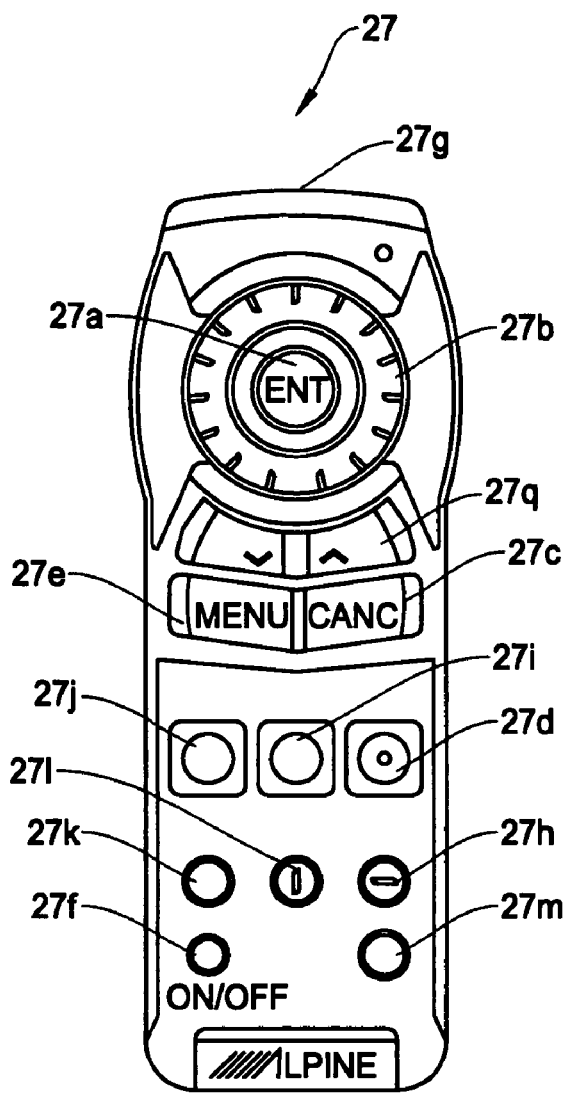
FIGS. 5A and 5B are diagrams showing an example of a remote controller accompanied by the vehicle navigation system of the present invention.
Figure 5B:
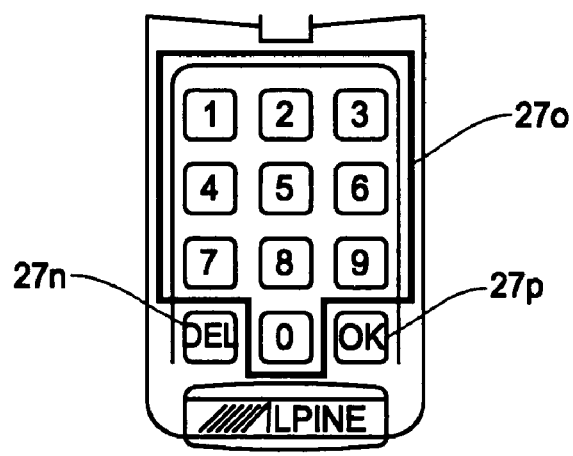

The remote controller 27 has a variety of function keys as shown in FIG. 5A and numeric keys as shown in FIG. 5B. The numeric keys appear when a lid in the lower part of FIG. 5A is opened. The remote controller 27 includes a joy stick/enter key 27a, a rotary encoder 27b, a cancel key 27c, an MP/RG key 27d, a menu key 27e, a zoom/scroll key 27q, a monitor ON/OFF key 27f, a remote control transmitter 27g, a plan key 27h, an N/H key 27i, a voice key 27j, a list key 27k, a detour key 27l, a delete destination key 27m, a delete key 27n, numeric keys 27o, and an OK key 27p.

The joy stick/enter key 27a selects highlighted items within the menu and moves map displays and a vehicle position icon. The rotary encoder 27b changes zoom scale, scrolls list pages, moves the cursor, and etc. The cancel key 27c cancels the present displayed screen or is operated when returning the screen to the previous menu screen. The MP/RG key 27d toggles between detailed map display and basic guide display during guidance. The menu key 27e displays the main menu. The plan key 27h starts the guidance to the route having two or more destinations, the N/H key 27i changes between north-up and heading-up orientation, the voice key 27j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and a joy stick on a head unit of the navigation system mounted on a dash board, touch screen of the display panel, and voice communication means.

Referring back to FIG. 4, the navigation system further includes a bus 26 for interfacing the above units in the system, a processor (CPU) 29 for controlling an overall operation of the navigation system, a ROM 30 for storing various control programs such as a route search program and a map matching program necessary for navigation control, a RAM 31 for storing a processing result such as a guide route, a voice interface and guiding unit 32 for voice communication interface and spoken instructions, a display controller 33 for generating map image (a map guide image and an arrow guide image) on the basis of the map information, a VRAM (video RAM) 34 for storing images generated by the display controller, a menu/list generating unit 35 for generating menu image/various list images, a synthesizing unit 35, a buffer memory 39 for temporarily storing data such as icon data for POI display, and a POI display control unit 40 for controlling a POI display operation in accordance with the present invention.

The POI display control unit 40 plays a major role in the display method of the present invention. The POI display control unit 40 checks the map data retrieved from the map data storage 21 in response to the search method specified by the user. The POI display control unit 40 determines whether each of the retrieved POIs is located within a large structure or not based on the point coordinate information and polygon information in the map data. Preferably, the buffer memory 39 stores data representing icons symbolizing the large structures.

Thus, when it is determined that a POI belongs to a particular large structure, such as a shopping mall, airport, train station, etc., the display control unit 40 retrieves the icon data representing the particular large structure from the buffer memory 39. The display control unit 40 controls the monitor 38 to display the retrieved icon along with the POI on the screen. The display control unit 40 further controls the monitor 38 to display the detailed information on the large structure when the user specifies the icon. The more details of the structure and operation of the POI display control unit 40 will be disclosed below with reference to FIG. 6.

Figure 6:
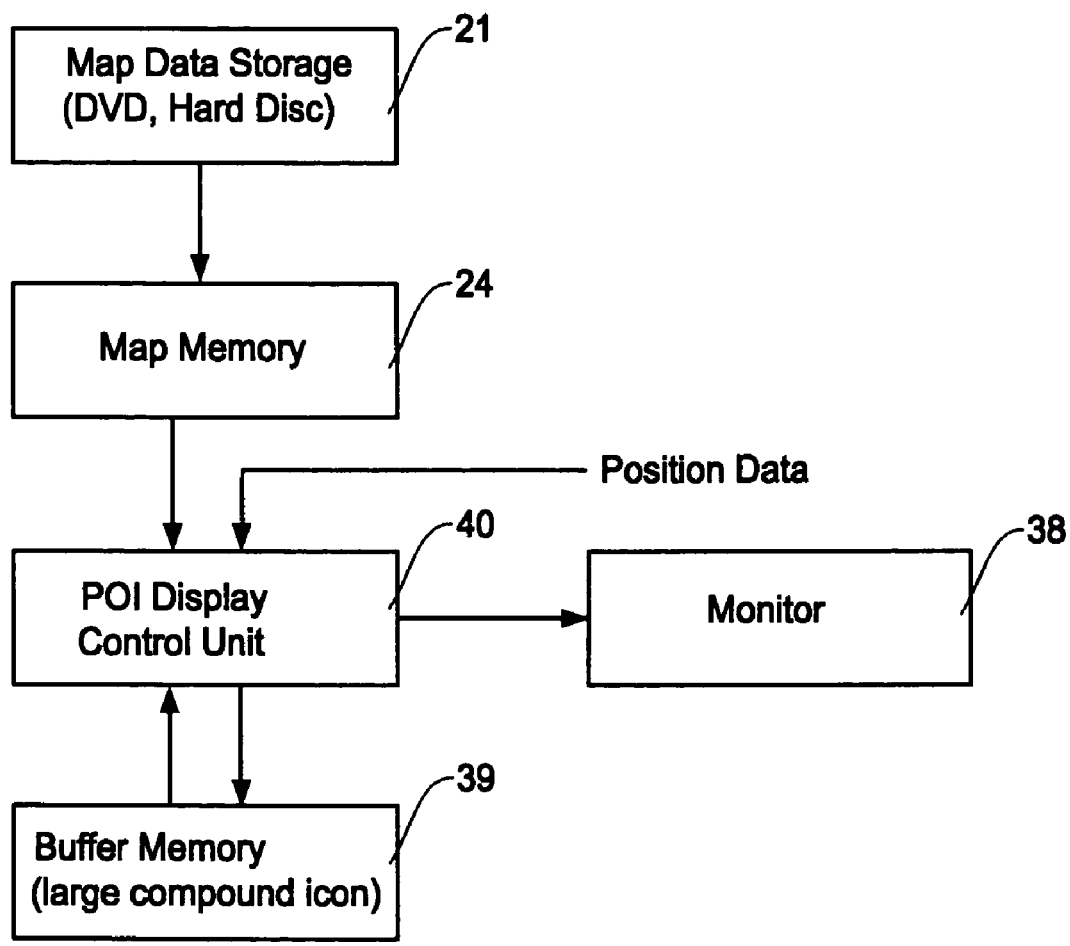
FIG. 6 is a block diagram showing an example of structure in the vehicle navigation system showing the essential components for implementing the display method of the present invention.

FIG. 6 is a schematic block diagram showing an example of structure in the navigation system for implementing the display method of the present invention. As noted above, on the screen of POI list, the navigation system superimposes an icon showing a large structure next to a POI name to indicate that the POI is located within the large structure. The icon to indicate such a large compound is preferably designed to show a shape indicating the function or visual image of the particular large structure, such as an airplane mark for an airport icon or an train image for a train station icon. However, an icon showing the large structure can take various forms such as simple characters, number or color. Examples of such a large structure or compound include a shopping mall, an airport, a train station, an amusement park, a military base, a sports stadium, an office building, a port, university, and the like and a large area, such as a mountain, a river, a lake, a desert, a reservoir, and the like.

The block diagram of FIG. 6 includes a map data storage 21, a map memory 24, a POI display control unit 40, a buffer memory 39, and a monitor 38, all of which are also shown in the block diagram of FIG. 4. The map data storage 21 stores map data which is the data base of the navigation system. The map data storage 21 is a DVD, CD-ROM, hard disc or any other storage medium that can store a large volume of map data. In the case where the navigation system is established in combination with a remote server through a communication network such as Internet, such map data can be provided to the user from a map data storage in the remote server. Under the control of the CPU 29 (FIG. 4), the map data is extracted from the map data storage 21 and is sent to the map information memory 24 so that the POI Display control unit 40 can access the data.

The POI display control unit 40 receives position data indicating the current position of the user from the CPU 29 and the map data from the map memory 24. The POI display control unit examines the map data as to whether or not the POI is located within the large structure. In the case where the POI is located within the large structure, the POI display control unit 40 checks the buffer memory 39 for retrieving the icon indicating the type of large structure associated with the POIs in the map data. The POI display control unit 40 sends the POI list and the large structure icons to display the result on the monitor 38.

The basic operation of the block diagram of FIG. 6 is described here with reference to display examples of FIGS. 7A-7B in the navigation system of the present invention. The user first sets an input method to "Point of Interest" (FIG. 7A) and selects a method of listing the retrieved POI names such as place type or place name (FIG. 7B). In this example, the user selects the "Place Type" method. In response, the navigation system displays a list of POI types (categories) as shown in FIG. 7C. In this example, the user selects "Fast Foods".

In response, the navigation system retrieves the map data including POI information from the map data storage 21 which is stored in the map information memory 24. The POI display control unit 40 checks the map data from the map memory 24 to see whether the retrieved POI is located within a large structure. As described later with reference to FIGS. 10 and 11, information for determining whether the retrieved POI is located within a large structure or not is available from the map data stored in the existing map data storage. If there is a POI that is located within a large structure, the POI display control unit 40 detects the information on the specific type of the large structure. Then the POI display control unit 40 retrieves the icon data that match with the type of large structure from the buffer memory 39. Thus, for the POI located in the large structure, the icon data is attached to the POI name.

Based on the position data, the POI display control unit 40 arranges the POI list, for example, in the order of distance from the current user position and the sends the POI list to the monitor 38. The monitor 38 displays the POI list combined with the icons of the large structures as shown in FIG. 7D. For example, "Icon" is displayed next to "Carl's Jr" indicating that "Carl's Jr" is located within a larger structure. Although the text form of "Icon" is shown in FIG. 7D, in an actual embodiment, icons of video image are preferably displayed on the screen indicating the types of large structure. When the POI is not located within a large structure, an icon is not displayed, although it is also possible to display an icon indicating that the POI is not located within a large structure. If the user desires to obtain more detailed information about the large structure, he selects the particular icon to retrieve the detailed information about the large structure from the map data.

Figure 8:
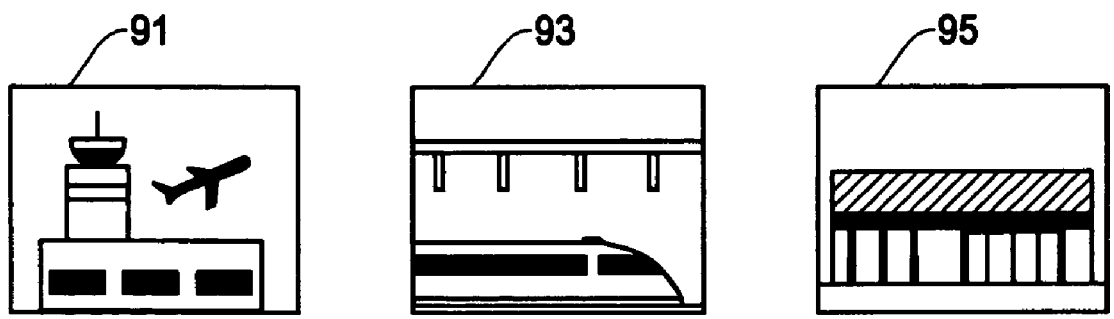
FIG. 8 shows examples of icon used to represent specific types of large structure in the navigation system of the present invention.

FIG. 8 shows examples of icons used to show the type of large structure in the present invention. An icon 91 indicates an airport to show that a POI is located within the airport. An icon 93 indicates a train station to show that a POI is located within the train station. An icon 95 indicates a shopping mall to show that a POI is located within the shopping mall. Although only three examples are shown in FIG. 8, many other icons representing other large structures are conceivable. For example, there may be an icon representing an office building, an icon representing a sports stadium, an icon representing a university, and the like. In the preferred embodiment, the icon depicts a visual image presenting the type of the super-unit in order to allow the user to quickly recognize the type of the large structure. Alternatively, the icons can simply be one or combination of characters, numbers or colors. A button or a mark may be also used for the icon indicating the type of the large structure.

Figure 9A:
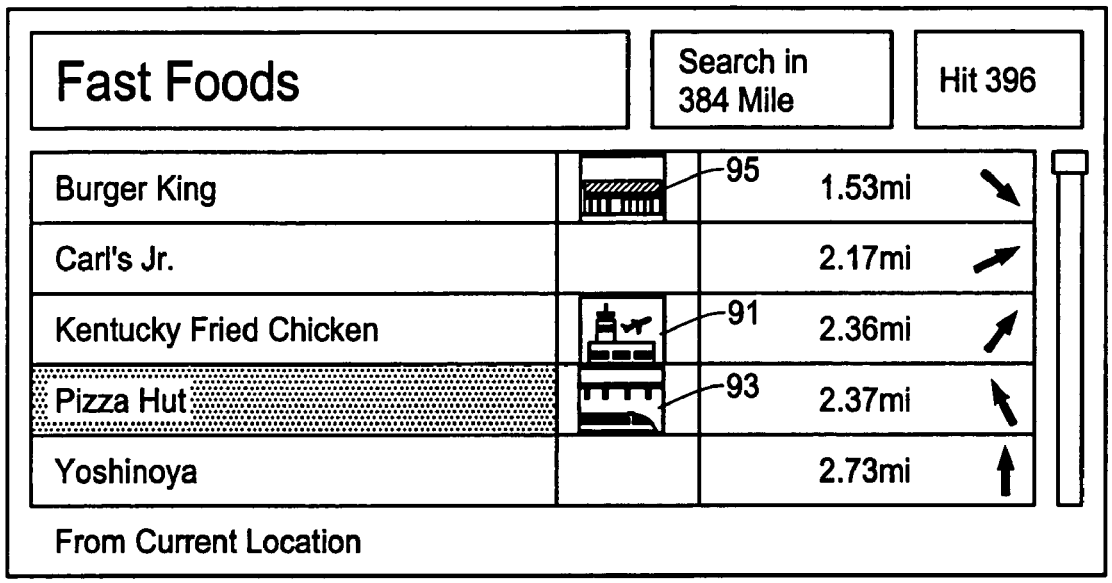
FIGS. 9A-9B are schematic diagrams showing an example of display to list POIs along with icons representing types of large structure in the navigation system of the present invention where

An example of display screen implementing the present invention is shown in FIG. 9A which is a more detailed view of FIG. 7D. In FIG. 9A, the display of the navigation system includes a superimposed icon next to the POI name when the POI is located within a large structure. For example, a shopping mall icon 95 shown in more detail in FIG. 8 is provided next to "Burger King" indicating that "Burger King" is located within the shopping mall.

Likewise, an airport icon 93 shown in more detail in FIG. 8 is provided next to "Kentucky Fried Chicken" indicating that "Kentucky Fried Chicken" is located within the airport. Because the information on such large structure is provided by the icons, it is easy for the user to recognize, at a glance, that a particular POI is located within a large structure as well as a particular type of the large structure. Moreover, because the icons take less space than that required by text information on the display screen, the present invention can be effectively implemented in an existing navigation display.

Figure 9B:

When the user specifies the icon on the screen, the navigation system provides more detailed information about the large structure. For example, FIG. 9B shows the condition wherein the user selects the airport icon 91 next to "Kentucky Fried Chicken" shown in FIG. 9A. Then, as shown in FIG. 9B, a pop-up screen is emerged showing the detailed information including the name of the airport, its address and phone number, etc. Although this function is provided for the user to obtain more detailed information, it may not be necessary when the user only wants to know whether a particular POI is an independent POI or a POI located within a large structure.

Alternatively, it is not necessary for the user to specify the icon on the screen to obtain the detailed information about the large structure each time the icon is displayed. For example, the detailed information can be announced through voice communication between the user and the navigation system. The information provided on the pop-up screen may be more detailed such as including business hours, other facilities, fees and charges, special events, etc. Further, the information may be less detailed than the example of FIG. 9B, for example, the pop-up screen may list only the name of the large structure.

Because the navigation system shows the corresponding large structure for each POI, the user can make a decision as to which POI is most preferable in the user's situation. For instance, referring to FIG. 9A, the user may wish to avoid "Burger King", which is indicated to be located within a shopping mall because it may be cumbersome to park at the mall when the parking lot is not close to "Burger King" or the mall may charge a parking fee. In that case, the user may prefer to go to "Carl's Jr." even though it is further away from the current location compared to "Burger King". On the other hand, the user may prefer to go to "Burger King" when the user wants to do shopping in the mall in addition to eat hamburgers. In this manner, the user can exert more control in determining which POI to choose.

Figure 10:
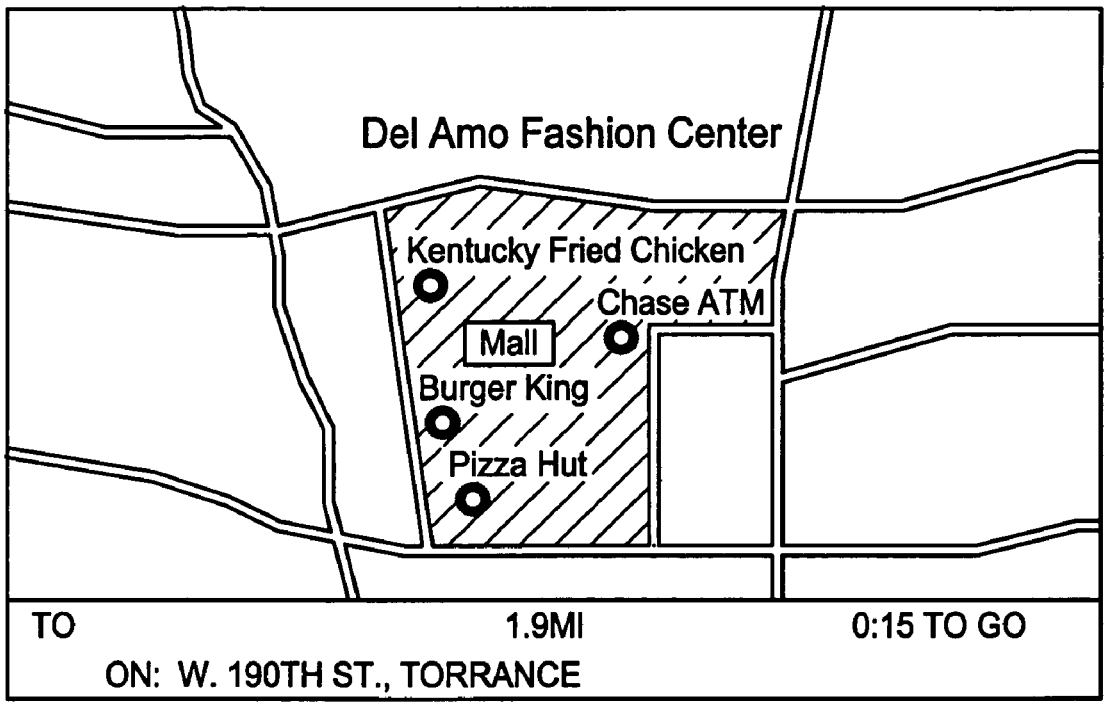
FIG. 10 is a schematic diagram showing an example of map image based on map data retrieved from a map data storage which includes point coordinate data specifying POIs and polygon data specifying a large structure for use in the navigation system of the present invention.

FIG. 10 shows an example of map screen of the navigation system showing POIs within a larger structure in the present invention. This example shows that several POIs are located within the large structure where solid circles on the map indicate the positions of the POIs. The shaded area indicates that the area is a large structure such as a shopping mall, airport, train station, etc. In this example, the large structure indicated by the shaded area is a shopping mall.

In the map data currently available from the map data storage 21 such as DVD in FIGS. 4 and 6, the location of each POI is represented by coordinate point information which shows a location of a point where the POI located. Further, in the map data, the shaded area of such a large structure is represented by polygon information which shows location and shape of a specific area. Namely, in the map data available today, the polygon information includes data showing an area of a large structure such as a shopping mall, airport, school, etc., or a land such as a military base, mountain, river, lake, reservoir, etc and their names. Thus, the navigation system is able to distinguish whether a particular POI is located within a large structure or not based on the map data retrieved from the map data storage 21. For example, the navigation system compares the point coordinate data and the polygon data and determining whether a point of the point of interest is located within the boundary of polygon data of the large structure.

Figure 11:
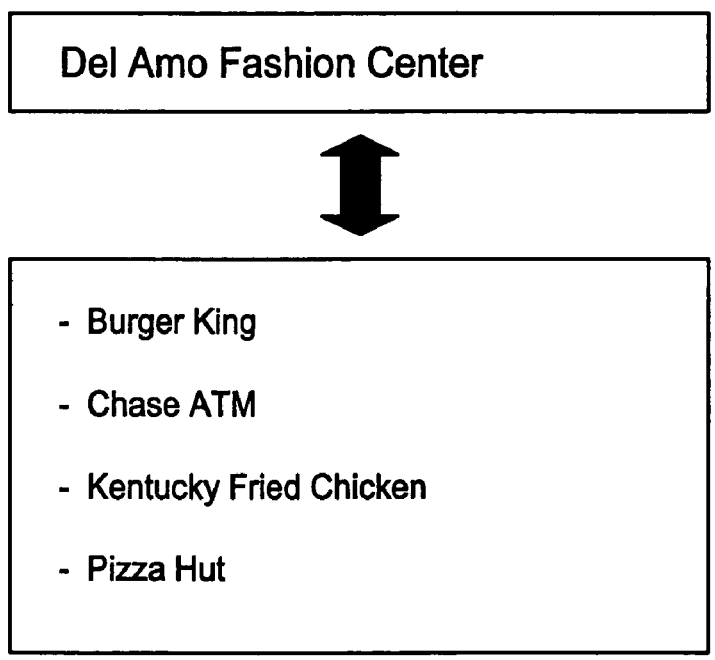
FIG. 11 is a schematic diagram showing a relationship between the large structure and the POIs within the large structure in the example of FIG. 10.

FIG. 11 schematically shows such a relationship between the large structure and the POIs within the large structure in the example of FIG. 10. As noted above, the relationship as to whether the retrieved POI belongs to any large structure is readily available from the map data or can be determined by examining the map data currently available from the map data storage. Thus, in FIG. 11, the navigation system is able to determine that the fast food POIs "Burger King" and the like are located within the large structure "Del Amo Fashion Center".

Even though the relationship between the POI location (coordinate point information) and the large structure (polygon information) is not readily available from the map data, the navigation system is able to detect whether the POI is within the large structure by analyzing positions of the POI and position and size of the large structure in map data. This arrangement will be effective when the processing speed of the navigation system is relatively fast. Moreover, this method has an advantage that it uses less storage area because the data indicating the relationship between the POI and the large structure need not be stored in the map data storage medium.

Figure 12:
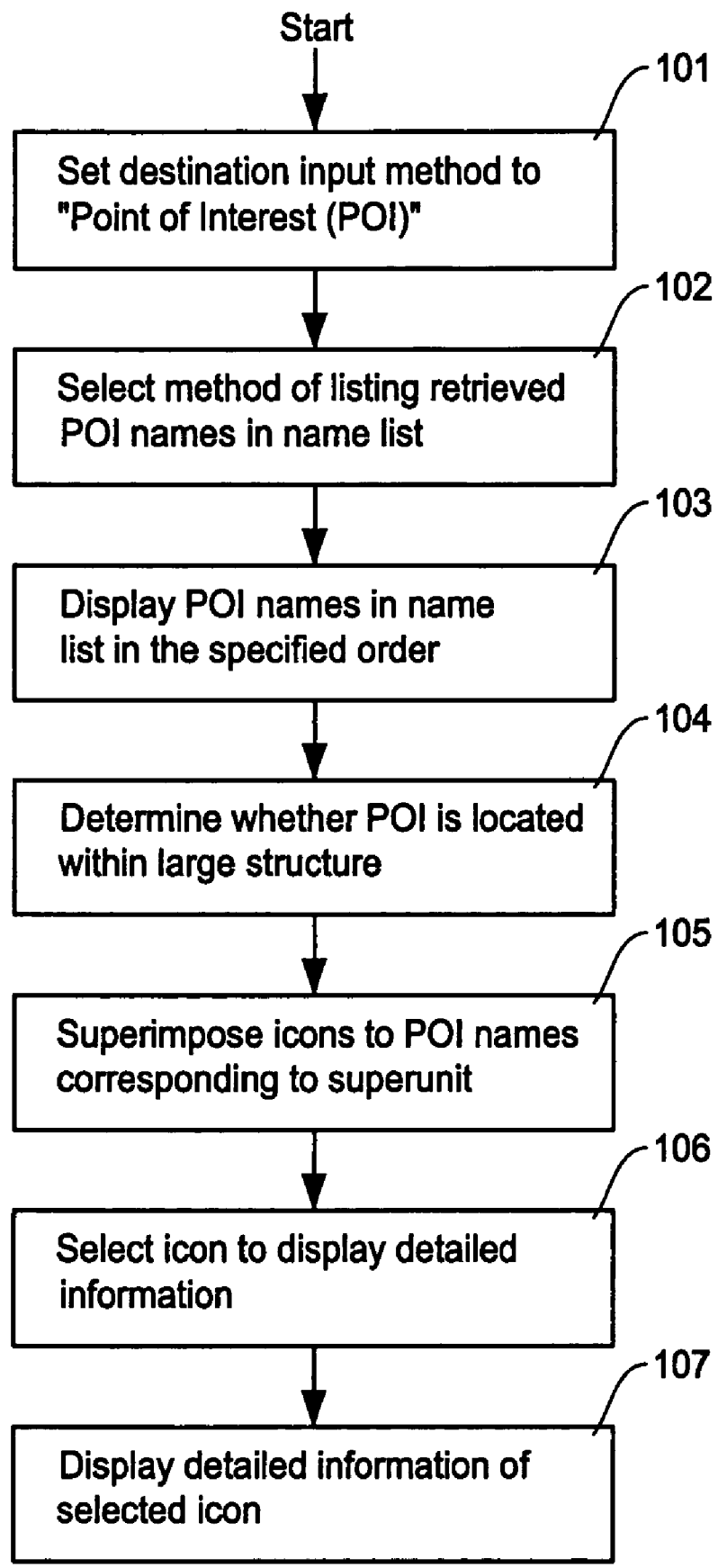
FIG. 12 is a flow chart showing the operational flow for selecting the search method and displaying a list of POIs incorporated with information on large structures in the navigation system of the present invention.

The process of displaying the icons indicating the large structure next to the POI names are described with reference to the flow chart of FIG. 12 which corresponds to the display example of FIGS. 7A-7D. First, the user sets the destination input method to "Point of Interest" at step 101 (FIG. 7A). Next, the user selects a method of listing the retrieved POI names in the name list in step 102 (FIG. 7B). Thus, the user may select to find the destination either by place type or place name. In the case where the user selects to find the destination by place type, the user may choose to find destination by "Fast Foods" (FIG. 7C). Thus, the navigation system lists the fast foods POIs in step 103 (FIG. 7D) in a predetermined order such as sorted by distance from the current user position.

At step 104, the navigation system determines whether an extracted POI is located within an area of a large structure, and if so, determines a type of the large structure. Then, the navigation system retrieves the icon representing the type of large structure, such as a shopping mall, from the buffer memory 39 for example, and superposes the icon on the POI list in step 105. This step corresponds to the screen display shown in FIG. 9A. Examples of large structure icon are shown in FIG. 8. If the user desires to obtain more detailed information about the large structure, the user may select the particular large structure on the display screen by selecting the corresponding icon in step 106. In step 107, the navigation system shows the detailed information such as a name, address, telephone number, etc. of the large structure. This step corresponds to the example of screen display shown in FIG. 9B.

As has been described above, the navigation system of the present invention is capable of informing the user about the existence of a large structure when a particular POI is located within the large structure. Thus, the user is able to decide not to go to that particular POI because it is located within the large structure, or alternatively, decide to go to that particular P01 because he can also use the large structure such as to do shopping or use a rest room, etc. The navigation system can effectively minimize the information on the screen to prevent distraction of the user's attention to the driving by providing the icons rather than text data. Moreover, the present invention can be readily implemented to a conventional navigation system where the space for a display is limited because the icon does not take much space on the display.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
   receiving map data from a map data storage and retrieving information on points of interest specified by a user;
   examining whether the point of interest specified by the user in the retrieved information is located within a structure;
   retrieving an icon representing a business type of the structure in which the point of interest is located; and
   displaying a list of names of points of interest specified by the user;
   wherein, when the specified point of interest is located within the structure, the list includes the icon representing the structure next to the name of the specified point of interest.

2. A display method for a navigation system as defined in claim 1, wherein said step of examining whether the point of interest is located within a structure includes a step of checking point coordinate data in the map data representing a location of the point of interest and polygon data in the map data representing an area of a land or a structure to see whether or not the location of the point of interest is included within the area of the land or structure.

3. A display method for a navigation system as defined in claim 1, wherein said step of examining whether the point of interest is located within a structure includes a step of comparing point coordinate data in the map data representing a location of the point of interest and polygon data in the map data representing an area of a land or a structure, and a step of determining whether or not the location of the point of interest is within a boundary of the structure defined by the polygon data.

4. A display method for a navigation system as defined in claim 1, further comprising the step of: displaying detailed information on the structure when the user specifies the icon representing the structure.

5. A display method for a navigation system as defined in claim 4, wherein said detailed information on the structure displayed on the navigation system includes a name and an address of the structure.

6. A display method for a navigation system as defined in claim 4, wherein said step of displaying the detailed information on the structure includes a step of producing a pop-up screen showing the detailed information on the monitor screen.

7. A display apparatus for a navigation system, comprising:
   means for selecting a method for searching point of interest information;
   a map data storage which stores map data including point of interest information and structure information;
   a point of interest display control unit which examines the map data from the map data storage and determines whether a point of interest specified by a user is located within a structure;
   a memory which stores icons where each icon represents the structure expressed by the structure information in the map data; and
   a monitor which displays information associated with the navigation system including a list of points of interest;
   wherein said point of interest display control unit controls said monitor to display a list of names of points of interest specified by a user, and when the point of interest specified by the user is located within the structure, the list includes the icon representing the structure next to the name of the specified point of interest.

8. A display apparatus for a navigation system as defined in claim 7, wherein said point of interest display control unit checks point coordinate data in the map data representing a location of the point of interest and polygon data in the map data representing an area of a land or a structure to see whether or not the location of the point of interest is included within the area of the land or structure.

9. A display apparatus for a navigation system as defined in claim 7, wherein said point of interest display control unit compares point coordinate data in the map data representing a location of the point of interest and polygon data in the map data representing an area of a land or a structure, and determines whether or not the location of the point of interest is within a boundary of the structure defined by the polygon data.

10. A display apparatus for a navigation system as defined in claim 7, wherein said point of interest display control unit causes said monitor to display detailed information on the structure when the user specifies the icon representing the structure.

11. A display apparatus for a navigation system as defined in claim 10, wherein said detailed information on the structure displayed on the navigation system includes a name and an address of the structure.

12. A display apparatus for a navigation system as defined in claim 10, wherein said point of interest display control unit causes said monitor to display a pop-up screen showing the detailed information on said structure.

13. A display apparatus for a navigation system, comprising:
   means for receiving map data from a map data storage and retrieving information on points of interest specified by a user;
   means for examining whether or not the point of interest specified by the user in the retrieved information is located within a structure;
   means for retrieving an icon representing the structure in which the point of interest is located; and
   means for displaying a list of names of points of interest specified by the user;
   wherein, when the point of interest is located within the structure, the list includes the icon representing the structure adjacent to the name of the specified point of interest.

14. A display apparatus for a navigation system as defined in claim 13, wherein said means for examining whether the point of interest is located within a structure includes means for checking point coordinate data in the map data representing a location of the point of interest and polygon data in the map data representing an area of a land or a structure to see whether or not the location of the point of interest is included within the area of the land or structure.

15. A display apparatus for a navigation system as defined in claim 13, wherein said means for examining whether the point of interest is located within a structure includes a step of comparing point coordinate data in the map data representing a location of the point of interest and polygon data in the map data representing an area of a land or a structure, and means for determining whether or not the location of the point of interest is within a boundary of the structure defined by the polygon data.

16. A display apparatus for a navigation system as defined in claim 13, further comprising means for displaying detailed information on the structure when the user specifies the icon representing the structure.

17. A display apparatus for a navigation system as defined in claim 16, wherein said detailed information on the structure displayed on the navigation system includes a name and an address of the structure.

18. A display apparatus for a navigation system as defined in claim 16, wherein said means for displaying the detailed information on the structure includes means for producing a pop-up screen showing the detailed information on the monitor screen.

* * * * *